United States Patent
Layec et al.

(10) Patent No.: US 8,422,582 B2
(45) Date of Patent: Apr. 16, 2013

(54) METHOD FOR SENDING AND RECEIVING A SIGNAL IN A MULTIPLE-ANTENNA SYSTEM IMPLEMENTING SPATIAL PRE-ENCODING, CORRESPONDING SENDER, RECEIVER AND COMPUTER PROGRAM PRODUCTS

(75) Inventors: Patricia Layec, Chatenay Malabry (FR); Raphael Visoz, Issy les Moulineaux (FR); Antoine Berthet, Chatenay Malabry (FR)

(73) Assignee: France Telecom, Paris (FR)

( * ) Notice: Subject to any disclaimer, the term of this patent is extended or adjusted under 35 U.S.C. 154(b) by 393 days.

(21) Appl. No.: 12/679,218

(22) PCT Filed: Sep. 5, 2008

(86) PCT No.: PCT/FR2008/051581
§ 371 (c)(1),
(2), (4) Date: Jun. 7, 2010

(87) PCT Pub. No.: WO2009/047416
PCT Pub. Date: Apr. 16, 2009

(65) Prior Publication Data
US 2010/0309995 A1    Dec. 9, 2010

(30) Foreign Application Priority Data
Sep. 20, 2007  (FR) ..................................... 07 57727

(51) Int. Cl.
*H04B 7/02*   (2006.01)
(52) U.S. Cl.
USPC ....................................................... 375/267
(58) Field of Classification Search ................... 375/260, 375/267
See application file for complete search history.

(56) References Cited

U.S. PATENT DOCUMENTS

| | | |
|---|---|---|
| 2003/0139139 A1 | 7/2003 | Onggosanusi et al. |
| 2010/0202553 A1* | 8/2010 | Kotecha et al. ............... 375/267 |

(Continued)

FOREIGN PATENT DOCUMENTS

| | | |
|---|---|---|
| EP | 1255369 A1 | 11/2002 |
| EP | 1850506 A1 | 10/2007 |
| WO | 2006002550 A1 | 1/2006 |
| WO | 2006037835 A1 | 4/2006 |

OTHER PUBLICATIONS

French Search Report dated May 6, 2008 for corresponding French Application No. 0757727, filed Sep. 20, 2007.

(Continued)

*Primary Examiner* — Don N Vo
(74) *Attorney, Agent, or Firm* — David D. Brush; Westerman, Champlin & Kelly, P.A.

(57) ABSTRACT

A method and apparatus are provided for emitting and receiving a signal in a multi-antennae system, using spatial precoding. A method for emitting a signal from an emitter towards a receiver via a transmission channel, in the form of a set of data flows, includes distributing the emission antennae into a plurality of groups containing at least one antenna, at least one group containing two antennae, according to at least one piece of information representing the transmission channel. The method also includes: attributing an efficiency to each emission antenna; allocating an emission power to each data flow; and spatial precoding the signal, using a matrix for diagonal precoding by blocks, containing at least two blocks, each block being associated with one of the groups of antennae.

14 Claims, 3 Drawing Sheets

U.S. PATENT DOCUMENTS

2011/0064156 A1* 3/2011 Kim et al. .............. 375/267
2011/0194650 A1* 8/2011 Lee et al. .............. 375/316
2012/0128044 A1* 5/2012 Kim et al. .............. 375/219

OTHER PUBLICATIONS

International Preliminary Report on Patentability and Written Opinion dated Apr. 7, 2010 for corresponding International Application No. PCT/FR2008/051581, filed Sep. 5, 2008.

International Search Report dated Jun. 29, 2009 for corresponding International Application No. PCT/FR2008/051581, filed Sep. 5, 2008.

Layec P. et al., "Achieving High Spectral Efficiency with Adaptive Layered Space Time Codes Under Rate Control" Communications, 2007. ICC '07. IEEE International Conference on, IEEE, PI—Jun. 1, 2007, pp. 725-731.

* cited by examiner

METHOD FOR SENDING AND RECEIVING A SIGNAL IN A MULTIPLE-ANTENNA SYSTEM IMPLEMENTING SPATIAL PRE-ENCODING, CORRESPONDING SENDER, RECEIVER AND COMPUTER PROGRAM PRODUCTS

CROSS-REFERENCE TO RELATED APPLICATIONS

This Application is a Section 371 National Stage Application of International Application No. PCT/FR2008/051581, filed Sep. 5, 2008 and published as WO 2009/047416 on Apr. 16, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of digital communications. More specifically, the disclosure pertains to the sending and receiving of signals in the context of MIMO (multiple-input multiple-output) type multiple-antenna systems.

The disclosure can be applied for example in radio communications in systems having frequency-selective transmission channels (single-carrier type systems) or frequency non-selective transmission channels (multiple-carrier type systems, for example of the OFDM or orthogonal frequency division multiplexing type).

In particular, the disclosure is situated at the level of the physical layer of a multiple-antenna mobile access network and can be applied to uplink communications (from a terminal to a base station) as well as to downlink communications (from a base station to a terminal).

BACKGROUND OF THE DISCLOSURE

The techniques for sending/receiving digital signals in multiple-antenna systems have many advantages, especially for the mobile access network. In particular, such techniques enable an increase in the bit-rate and/or reliability of the transmission in the context of a wireless communication.

There is a known technique of transmission in the prior art well suited to MIMO systems in which the transmission channel varies. This technique, also known as link adaptation, consists in adapting the resources used when sending as a function of a piece of information representing the transmission channel. This technique therefore calls for feedback between the receiver and the sender, providing the sender with the knowledge (generally partial knowledge) of the transmission channel.

In particular, this link adaptation can be dynamic and makes it possible to adapt to instantaneous variations in the transmission channel, by seeking to maximize the bit-rate of the radio link while at the same time complying with a certain quality of service requirement, such as for example a maximum bit-error rate.

To this end, the MCS (Modulation and Coding Scheme) assigned to each sending antenna, i.e. each data stream, and optionally the sending power values allocated to each data stream are modified. It may be recalled that, in a multiple-antenna system, the source signal to be sent is sent in the form of a set of data streams between the send antennas and the receive antennas.

The document by P. Layec, R. Visoz, and A. O. Berthet, "*Achieving High Spectral Efficiency with Adaptive Layered Space Time Codes under Rate Control*" (ICC 2007-IEEE) presents especially a multiple-antenna transmission system implementing the dynamic link adaptation method. In this technique, a space-time encoding is combined with a PARC (Per Antenna Rate Control) type of architecture implementing per antenna rate control. It may be recalled that the term "rate" classically is understood to mean a choice of modulation and encoding scheme (MCS), i.e. it comprises:
- the rate of the channel code: for example ¼, ⅓, ½, etc;
- the order of the modulation chosen, for example BPSK (binary phase-shift keying), QPSK (Quadrature PSK), 16QAM (16-quadrature amplitude modulation) type modulation etc.

More specifically, the technique presented in the above-mentioned document assumes that there is a set of discrete rate values available. Conversely, it may be recalled that the results of information theory are based on infinite precision of rates and sending power values, thus assuming an infinite feedback link which is unachievable in practice.

In order to compensate for the deterioration in the capacity generated by the discretization operation, this prior art technique seeks to jointly optimize the discrete rates and the power value allocated to each sending antenna, in distributing the sending antennas among groups of antennas.

Thus, a receiver can determine the MCS (or discrete rate values) per group of antennas to be used in sending mode to minimize the difference with the theoretical performance values on the basis of knowledge of a family of MCS schemes available in sending mode (according to the sending standard for example) and transmit these elements to the sender in a feedback path, for example in a CQI (channel quality indicator) message.

The transmission system thus has adaptive distribution from an uplink of information to another, in order to combat quantification noise, or a distribution that is well defined during the configuration of the system and fixed throughout the duration of the transmission of the system.

However, one drawback of this prior art technique is that it relies on the assumption of a transmission of data streams that is independent per sending antenna, i.e. that the covariance matrix of the signal to be transmitted is diagonal, thus generating interference between the data streams.

SUMMARY

An exemplary embodiment of the invention relates to a method for sending a signal from a sender to a receiver through a transmission channel, in the form of a set of data streams between $N_T$ sending antennas and $N_R$ receiving antennas, with $N_T$ and $N_R$ being greater than or equal to 2.

According to an embodiment of the invention, such a method comprises:
- a step for distributing sending antennas among several groups of at least one antenna, at least one group comprising two antennas, as a function of at least one piece of information representing the transmission channel;
- a step for assigning a rate value to each of the sending antennas;
- a step for allocating a sending power value to each of said data streams; and a step for a spatial pre-encoding of the signal, implementing a block diagonal pre-encoding matrix comprising at least two blocks, each block being associated with one of the groups of antennas.

Thus, in addition to bringing the sending antennas together in groups, an embodiment of the invention proposes to apply a pre-encoding to each group of sending antennas.

Such a spatial pre-encoding process makes it possible especially to send on eigen modes of the transmission sub-channels. More specifically, a "sub-channel" corresponds to the transmission channel between the sending antennas of the group considered, associated with a block of the pre-encoding matrix, and the receiving antennas. The transmission channel between the sender and the receiver is therefore partially decorrelated.

However it may be recalled that, according to the prior art, no linear conversion whatsover, to break down the MIMO channel into several SISO (Single-Input Single-Output) channels that are mutually non-interfering, is done before the transmission of the data.

Thus, the signal received according to an embodiment of the invention is less disturbed.

In particular, the apportionment of the sending antennas among several groups, i.e. the number of groups and the number of antennas forming each group, can be fixed (for example depending on the application considered or the sending standard). In this case, the step for distributing sending antennas makes it possible to determine which sending antenna is allocated to which group, according to the fixed apportionment. For example, if a apportionment $\Gamma$ comprising three groups $\Delta_1, \Delta_2, \Delta_3$, where $\Delta_1$ comprises two sending antennas ($|\Delta_1|=2$), $\Delta_2$ comprises two sending antennas ($|\Delta_2|=2$), and $\Delta_3$ comprises one sending antenna ($|\Delta_3|=1$), and if we consider a sender comprising five sending antennas $N_{T1}$ to $N_{T5}$, then the step for distributing antennas allocates for example the antennas $N_{T1}$ and $N_{T2}$ to the group $\Delta_1$, the antennas $N_{T3}$ and $N_{T4}$ to the group $\Delta_2$, and the antenna $N_{T5}$ to the group $\Delta_3$. More generally, an apportionment is defined by $\Gamma=\{\Delta_1, \ldots, \Delta_K\}$, with $\forall i \in \{1, \ldots, K\}, \forall j \in \{1, \ldots, K\}$, $$\bigcup_i \Delta_i = \{1, \ldots, N_T\} \text{ et}$$

$$j \neq i: \Delta_i \cap \Delta_j = \emptyset.$$

This step for distributing may be implemented periodically and/or as a function of a variation of the transmission channel.

For example, if we again consider the fixed apportionment $\Gamma$, the step for distributing antennas assigns, for example, the antennas $N_{T3}$ and $N_{T5}$ to the group $\Delta_1$, the antennas $N_{T1}$ and $N_{T2}$ to the group $\Delta_2$, and the antenna $N_{T4}$ to the group $\Delta_3$, as a function of a piece of information fedback by the receiver relative to a variation of the transmission channel. If the transmission channel is invariant, the distribution of the sending antennas is not necessarily updated. By contrast, an updating may be needed if there is a modification of the power values and/or of the rate values assigned to the sending antennas.

The apportionment of the sending antennas (i.e. the number of groups and the number of antennas per group) may also be adapted and modified periodically and/or as a function of a variation of the transmission channel.

It can also be noted that, according to an embodiment of the invention, a rate value is assigned to each of the sending antennas and a sending power value is assigned to each of the data streams. The rates are not necessarily assigned to each group of antennas but specifically for each sending antenna. It can be noted that such a scalar encoding (i.e. an encoding along the time dimension only) is easier to decode than a space-time encoding.

In particular, the rate values are chosen from a predetermined set of discrete rate values. This choice depends on at least one constraint dictated by the receiver such as the type of receiver (for example a receiver of a type with successive cancelations of interference).

For example, the predetermined set of rates is defined in a table of rates fixed by the standard. This set is also called a set of MCS (modulation coding schemes).

Similarly, the pre-encoding vectors forming the blocks of the pre-encoding matrix must be defined in a pre-encoding table, also called a codebook, also defined in the standard.

According to one particular characteristic of an embodiment of the invention, the pre-encoding step comprises a sub-step for obtaining eigen vectors associated with each of the blocks.

Using these eigen vectors, which are orthonormated, the method determines the sending power values of each data stream and the signal is sent on the non-zero eigenvalues of each of the sub-channels. It may be recalled that a sub-channel corresponds to the transmission channel between the sending antennas of a group associated with a block of the pre-encoding matrix, and the receiving antennas.

In particular, the sending method according to the an embodiment of invention comprises a step for updating at least one element belonging to the group comprising:
  at least one of said blocks;
  at least one of said rate values;
  at least one of said sending power values;
  at least one pre-encoding vector, each block of the pre-encoding matrix comprising at least one pre-encoding vector;
as a function of a piece of feedback information from the receiver.

This updating can be done periodically, as a function of a variation of the transmission channel, as a function of a request from a user, as a function of the modification of a sending parameter etc. It can be noted that these different elements can be updated even if the distribution of the sending antennas has not been modified.

According to one particular aspect of an embodiment of the invention, the sending method comprises a step for receiving at least one element belonging to the group comprising:
  a piece of information on the distribution into groups of the sending antennas;
  the information representing the transmission channel;
  the rate values assigned to each of the sending antennas;
  the pre-encoding matrix;
  the blocks forming said pre-encoding matrix;
  pre-encoding vectors to build the pre-encoding matrix;
  sending power values required for each data stream, for each group of sending antennas or for all the sending antennas.

Indeed, it may be recalled that, according to an embodiment of the invention, the distribution into groups of the sending antennas can be determined on the receiver side as a function of the information representing the transmission channel and then transmitted to the sender, or else determined on the sender side following the reception of information representing the transmission channel.

Similarly, the pre-encoding matrix can be determined on the receiver side and transmitted to the sender, or else the blocks or the pre-encoding vectors forming the pre-encoding matrix can be determined on the receiver side and sent to the sender which determines the corresponding pre-encoding matrix etc.

Another embodiment of the invention pertains to a sender capable of sending a signal to a receiver through a transmission channel in the form of a set of data streams between $N_T$ sending antennas and $N_R$ receiving antennas with $N_T$ and $N_R$ being greater than or equal to 2.

According to this embodiment, the sender comprises:
means for distributing sending antennas among several groups of at least one antenna, at least one group comprising two antennas, as a function of at least one piece of information representing the transmission channel;
means for assigning a rate value to each of the sending antennas;
means for allocating a sending power value to each of said data streams; and
means for the spatial pre-encoding of the signal, implementing a block diagonal pre-encoding matrix comprising at least two blocks, each block being associated with one of the groups of antennas.

Such a sender is adapted especially to implementing the sending method described here above. This sender may for example be a base station or a terminal of a radio telephony, a laptop computer, a personal digital assistant (PDA) type depending on whether the device is in an uplink or in a downlink.

Another aspect of the invention pertains to a method for receiving a received signal, corresponding to a signal sent by a sender to a receiver through a transmission channel, in the form of a set of data streams between $N_T$ sending antennas and $N_R$ receiving antennas, with $N_T$ and $N_R$ being greater than or equal to 2.

According to an embodiment of the invention, such a method for receiving comprises:
a step for obtaining, as a function of a piece of information representing the transmission channel, at least one distribution of sending antennas in several groups of at least one antenna, at least one group comprising two antennas;
a step for determining a rate value to be assigned to each of said sending antennas;
a step for determining a sending power value to be allocated to each data stream;
a step for determining a block diagonal pre-encoding matrix comprising at least two blocks, each block being associated with one of said groups of antennas; and
a step for transmitting said rate values, said sending power values, and said pre-encoding matrix to the sender.

Thus, according to this aspect of the invention, it is the receiver that determines the rate values to be assigned to each sending antenna, the sending power values associated with the data stream as well as the corresponding spatial pre-encoding matrix.

In particular, the rate values are chosen from a predetermined set of discrete rate values.

An embodiment of the invention takes account of the characteristics of the receiver and of the transmission channel in order to optimize the rate values assigned to each sending antenna, the sending power values allocated to each data stream and in order to distribute the data to be sent on the different sending antennas through the spatial pre-encoding.

According to one particular characteristic of an embodiment of the invention, the receiver is a successive interference cancellation (SIC) type of receiver.

The invention, in another embodiment, pertains to a receiver capable of receiving a received signal corresponding to a signal sent by a sender through a transmission channel in the form of a set of data streams between $N_T$ sending antennas and $N_R$ receiving antennas with $N_T$ and $N_R$ being greater than or equal to 2.

According to this embodiment, such a receiver comprises:
means for obtaining, as a function of a piece of information representing the transmission channel, at least one distribution of sending antennas in several groups of at least one antenna, at least one group comprising two antennas;
means for determining a rate value to be assigned to each of said sending antennas;
means for determining a sending power value to be assigned to each of said data streams;
means for determining a block diagonal pre-encoding matrix comprising at least two blocks, each block being associated with one of said groups of antennas; and
means for transmitting the rate values, the sending power values, and the pre-encoding matrix to the sender.

Such a reception device is adapted especially to implementing the method for receiving described here above. It may for example be a base station or a terminal of a radio telephony, a laptop computer, a personal digital assistant (PDA) type depending on whether the device is in an uplink or in a downlink.

Another aspect of the invention pertains to a system for transmitting formed by a sender comprising $N_T$ sending antennas and a receiver comprising $N_R$ receiving antennas with $N_T$ and $N_R$ being greater than or equal to 2.

Such a system is used to send a signal in the form of a set of data streams between the $N_T$ sending antennas and the $N_R$ receiving antennas.

According to an embodiment of the invention, the receiver comprises means for obtaining, as a function of a piece of information representing a transmission channel between the sender and the receiver, at least one distribution of sending antennas in several groups of at least one antenna, at least one group comprising two antennas, and the sender comprises means for distributing sending antennas according to the distribution;
the receiver also comprises:
means for determining a rate value to be assigned to each of the sending antennas;
means for determining a sending power value to be allocated to each of the data streams;
means for determining a block diagonal pre-encoding matrix comprising at least two blocks, each block being associated with one of said groups of antennas; and
means for transmitting, to said sender, rate values, sending power values, and pre-encoding matrix,
and the sender also comprises:
means for assigning rate values to the sending antennas;
means for allocating sending power values to said data streams;
means for the spatial pre-encoding of the signal to be sent, implementing the pre-encoding matrix.

In particular, the receiver is a successive interference cancellation (SIC) type of receiver.

Yet another aspect of the invention pertains to a computer program product downloadable from a communications network and/or recorded on a computer-readable carrier and/or executable by a processor, comprising program code instructions for executing the method for sending as described here above, and/or a computer program product downloadable from a communications network and/or recorded on a computer-readable carrier and/or executable by a processor, comprising program code instructions for executing the method for receiving as described here above.

BRIEF DESCRIPTION OF THE DRAWINGS

Other features and advantages shall appear more clearly in the following description of a preferred embodiment given by way of a simple illustratory and non-exhaustive example, and from the appended drawings, of which.

DETAILED DESCRIPTION OF ILLUSTRATIVE EMBODIMENTS

1. General Principal

The general principal of an embodiment of the invention relies on the implementation of a spatial pre-encoding operation in sending mode, in a multiple-antenna system comprising at least two sending antennas $N_T \geq 2$ and two receiving antennas $N_R \geq 2$. It may be recalled indeed that a spatial multiplexing of the data makes it possible to attain high spectral efficiency values.

More specifically, the sending antennas are grouped together in groups of antennas as a function of at least one piece of information representing the transmission channel between the sender and the receiver. There is therefore a feedback path between the receiver and the sender giving the sender partial knowledge of the transmission channel. This feedback path also adapts the distribution of the sending antennas taking into account the variations of the transmission channel.

The spatial pre-encoding according to an embodiment of the invention then implements a blockwise diagonal pre-encoding matrix comprising at least two blocks, each block being associated with one of the groups of antennas.

Thus, while the prior art technique presented in: "*Achieving High Spectral Efficiency with Adaptive Layered Space-Time Codes under Rate Control*" proposes to transmit independent data streams per sending antennas, i.e. proposes to achieve a control of power values implemented by a diagonal covariance matrix of the sent signal, an embodiment of the present invention relies on the use of one pre-encoding block per group of antennas, the set of the pre-encoding blocks forming a pre-encoding matrix. The covariance matrix of the signal sent, formed by the pre-encoding matrix and the sending power values, is therefore diagonal by blocks.

The implementation of spatial pre-encoding in sending mode makes it possible especially to send on the eigen modes of the transmission sub-channels. Thus, the transmission channel is partially decorrelated, and this limits interference at reception.

To this end, eigen vectors are determined for each of the blocks, so as to transmit the signal on the non-zero eigenvalues of each of the sub-channels. It can be noted that the blocks of the pre-encoding matrix can be regularly re-updated, or re-updated as a function of the variations in the transmission channel, or as a function of a change in a sending parameter, etc. There is therefore a feedback path between the receiver and the sender (which as the case may be is distinct from the feedback path transmitting information to the sender for the groupwise distribution of the sending antennas), making it possible to re-update the sending parameters (rate and/or power values and/or pre-encoding matrix).

Furthermore, according to an embodiment of the invention, a specific rate value is assigned to each of the sending antennas, i.e. a scalar rate value and no longer a rate per group of antennas.

This characteristic has the effect especially of lower decoding complexity.

Figure 1:
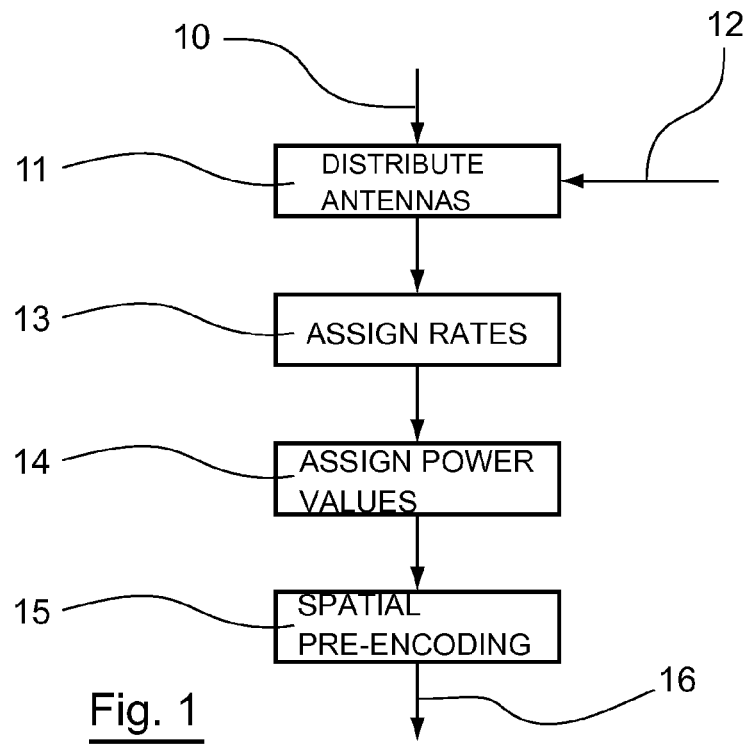
FIG. 1 illustrates the main steps of the sending method according to a particular embodiment of the invention.

Referring now to FIG. 1, we present the main steps of the method for sending a source data signal 10 according to an embodiment of the invention.

At a first step 11, the sending antennas are distributed among several groups of antennas, at least one group comprising two antennas. This distributing 11 is done in taking account of at least one piece of information representing the transmission channel. More specifically, the receiver can determine an optimal distribution according to the information representing the transmission channel and can transmit (12) this distribution through the sender in a feedback path or else it can directly transmit (12) the information representing the transmission channel to the sender, which itself determines the optimum distribution.

Then a rate value (13) is assigned to each of the sending antennas and a sending power value (14) is assigned to each of the data streams.

In a following step 15, the signal undergoes a spatial pre-encoding operation implementing a blockwise diagonal pre-encoding matrix comprising at least two blocks, each block being associated with one of the groups of antennas.

The signal 16 thus pre-encoded is then sent on eigen modes of the transmission sub-channels between each group of sending antennas and the receiving antennas.

2. Description of a Particular Embodiment in a Single-User Context

A) Sending and Reception Schemes.

Here below, a description is provided of a particular embodiment of the invention that can be used to maximize the spectral efficiency of the multiple-antenna system in complying with quality-of-service constraints and a partial knowledge of the sending channel.

More specifically, a description is provided here below of an original algorithm that is used to obtaining pre-encoding blocks per group maximizing transmission performance, and is compatible with a simplified receiver. We also discuss information to be transmitted in the feedback path or paths between the receiver and the sender.

Thus, according to this particular embodiment, the sending antennas are distributed among groups and the sender implements a spatial-pre-encoding by groups, thus reducing the load of the feedback path. For a given apportionment, the sender is optimized by a joint processing operation between the pre-encoding blocks associated with each of the groups of sending antennas, the sending power values allocated to each data stream and the selection of rate values for each sending antenna (corresponding to a choice of MCS). Thus, the spectral efficiency of the MCS values that can be allocated to each non-zero eigen mode of the transmission subchannels is maximized.

The description shall be situated more specifically in a point-to-point MIMO context corresponding to a user (a sender) comprising K groups of antennas.

According to this particular embodiment of the invention, the sending operation is also constrained in assuming a reception of the type with successive cancellations of interference. With this constraint, the pre-encoding blocks are built so as to be adapted to a SIC receiver. The closest vector in the codebook (or pre-encoding table) is then selected. The receiving operation is thereby facilitated.

This joint optimization under constraint reduces the quantification noise and therefore increases transmission performance, especially in terms of spectral efficiency.

It can also be noted that the necessary quantity of information transmitted on the feedback path depends on the apportionment chosen. This choice is a function notably of a compromise between performance and desired quantity of information transported.

In particular, the greater the number of groups, the greater the reduction in the quantity of information returned to the sender (in proportion to the size of the pre-encoding blocks). It may be recalled that the number of groups K is strictly greater than 1 (i.e. there are at least two groups of antennas), and strictly smaller than $N_T$ (which means that at least one of the groups has two sending antennas).

Here below, referring to FIGS. 2 and 3, we describe a sending scheme and a reception scheme according to this particular embodiment of the invention.

Figure 3:
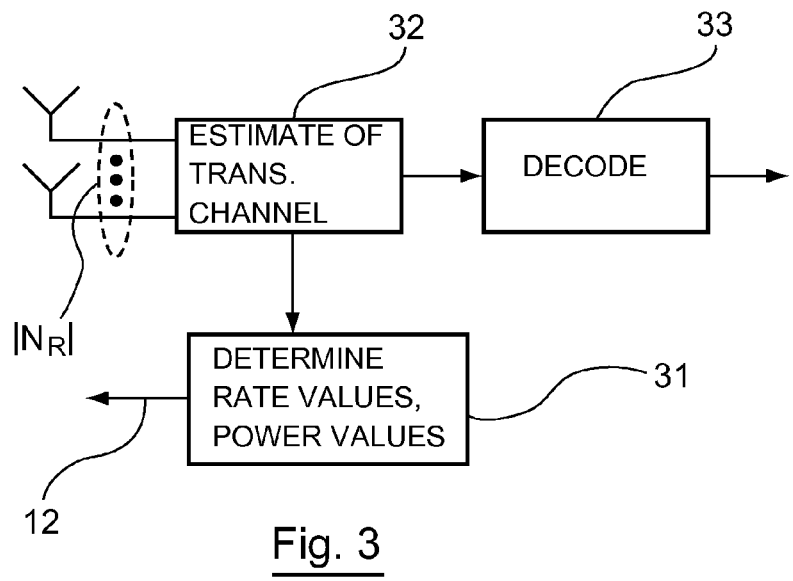

As illustrated in FIG. 3, the steps for determining rate values, sending power values and pre-encoding blocks are deemed to be implemented jointly by the receiver during a step 31, in taking account of the following constraints:
Constraints of desired quality-of-service taking account of:
  a predetermined set of discrete rate values available (or order of modulations and code rate values available, enabling a quantification of the rate values and of the sending power values); and/or
  a bit error rate (BER) or frame error rate (FER) requested; and/or
  an available codebook (used to define the pre-encoding vectors adapted to a simple SIC receiver and therefore the pre-encoding blocks and the pre-encoding matrix); and/or
  a value of total power to be redistributed on the data streams;
  etc;
information on the transmission channel (for example coming from an estimation of the transmission channel or of the signal-to-interference-plus-noise ratio (SINR).

Thus, the signal received by the receiver on the $N_R$ receiver antennas is first of all processed to obtain an estimation of the transmission channel 32. This estimation 32 is taken into account in order to determine and adapt (31) rate values, sending power values and pre-encoding blocks as well as to decode (33) the signal or the packet received.

It may be recalled that the set of pre-encoding blocks forms a pre-encoding matrix adapted, in this particular embodiment, to a simple SIC receiver, each block being associated with a distinct group of sending antennas. The reference $V_k$ is used to denote the pre-encoding block associated with the group k with $1 \leq k \leq K$.

In particular, the sending power values are determined from applications of the Waterfilling algorithm. It may be recalled that the Waterfilling type of algorithm is used to distribute the sending power chiefly on strong eigen modes of the transmission channel, i.e. the channels with good radio conditions, while little or even no power whatsoever is allocated to channels with poor radio conditions.

In this embodiment of the invention, an iterative Waterfilling type of algorithm is thus applied, comprising Waterfilling operations on the system comprising K groups of antennas.

In particular, the implementation of an iterative Waterfilling type algorithm on the K groups of antennas gives better asymptotic performance values since an embodiment of the invention depends to a greater extent in this embodiment on weaker radio links.

Then, these sending parameters (rate values, sending power values and pre-encoding blocks) are transmitted to the sender in a feedback path 12.

For example, the signaling of these sending parameters can be done by separately assigning one CQI per antenna for the choice of a rate value (MCS) or power value, and one CQI per group for the choice of the pre-encoding block. The feedback path therefore carries $N_T$ rate values to assign one rate value to each sending antenna, $N_T$ power values to assign one power value to each data stream and K values of pre-encoding blocks to assign one pre-encoding block to each group.

According to another variant, it is possible to enumerate all the possible configurations of rate values (i.e. $N_{MCS}$ discrete rate values available), discrete sending power values (quantified on $N_{pwr}$ different levels) and pre-encoding blocks $V_k$ (that is, $N_{V_k}$ available blocks) determined jointly. In this way, a single CQI is fedback designating all the sending parameters simultaneously.

The number of bits b needed for the CQI is given by:

$$b = \lceil \log_2 [N_{MCS}^{N_T} \cdot N_{pwr}^{N_T} \cdot N_{V_k}^{K}] \rceil;$$

where the operator ⌈ ⌉ sign designates the higher integer part.

In this variant, a bigger-sized correspondence table is therefore necessarily stored at sending and at reception. A row of this correspondence table corresponds to the combination of $N_T$ MCSs (each being chosen from the table of discrete rate values), $N_T$ sending power values and K pre-encoding blocks (each being chosen from the pre-encoding table).

The joint enumeration according to this variant thus uses at most as many bits as the number of bits used to signal sending parameters transmitting each piece of information separately.

At reception of the sending parameters, the sender may assign the rate values and the sending power values, update the pre-encoding matrix and continue the transmission of the signal.

Figure 2:
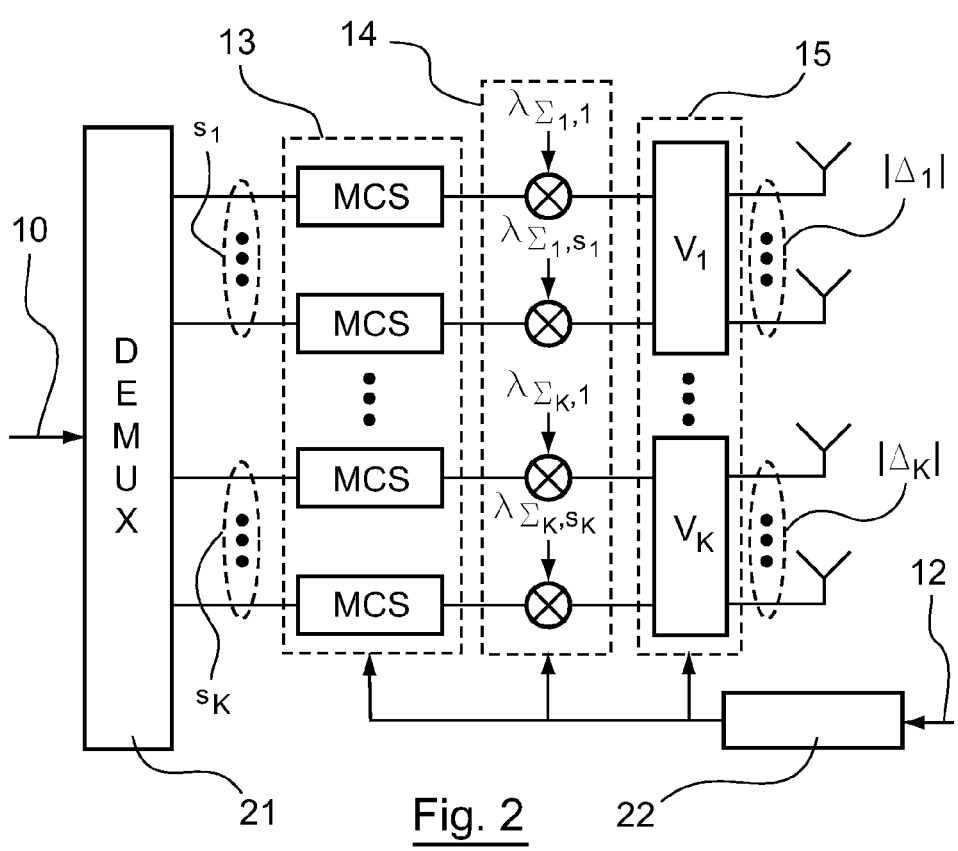
FIGS. 2 and 3 respectively represent an example of a sending scheme and a receiving scheme in a single-user context.

More specifically, as illustrated in FIG. 2, the sending antennas are grouped in K groups, the cardinality of which ranges from 1 to $N_R$.

The source data signal 10 at input of the sender is first of all demultiplexed during a step DEMUX 21, and converted into a number of independent streams corresponding to the number of non-zero eigen values of this transmission sub-channel.

For example, if we consider the pre-encoding block $V_k$ associated with the group of sending antennas $\Delta_k$, with cardinality $|\Delta_k|$, we obtain $s_k$ non-zero eigen values with $s_k = \min(N_R, |\Delta_k|)$.

We thus obtain $$\sum_{k=1}^{K} s_k$$

independent streams.

Then, a scalar rate value (MCS 13) and a sending power value (14) is assigned to each of the independent streams as a function of information carried by the feedback path 12 and extracted by the controller 22. In particular, $\lambda_i(\Sigma_k)$ denotes the ith diagonal element of the matrix $\Sigma_k$ extracted by the controller 22, the matrix $\Sigma_k$ defining the power values to be assigned to each data stream of the group k.

A spatial pre-encoding (15) is then implemented using a blockwise diagonal pre-encoding matrix comprising blocks $V_1, V_2, \ldots, V_K$. The pre-encoding is therefore done by groups of antennas.

Thus, the data signal is transmitted on the $s_k$ non-zero eigen values of each sub-channel associated with each group k.

B) Determining Sending Parameters

Here below, a description is given of the steps for determining rate values, power values and pre-encoding blocks to optimize the capacity of the transmission system.

To this end, it is sought to reduce a cost function associated with the multiple-antenna system by optimizing the overall capacity of the transmission system. The criterion of optimization of overall capacity, also called discrete sum-capacity, relies on knowledge of the channel H of transmission (between the sender and the receiver) at reception, of the signal-to-noise ratio SNR $\rho$, of the power budget available for distributing P, of the set of MCS, of the rate values effectively chosen from the set of rate values available as a function of the desired quality of service etc, and can be expressed as follows:

$$T = \max_{\{\Theta_{x_{\Delta_k}}\}_{k=1}^K} \sum_{k=1}^{K} \sum_{i=1}^{s_k} R_{k,i} \quad (1)$$

with the allocated discrete rate values:

$$R_{k,i} = \arg\min_{R \in J, R_{k,i} \le C_{k,i}} C_{k,i} - R \quad (2)$$

R being a rate value chosen in the table of discrete rate values denoted J, and with the following constraints:

$$\Theta_{x_{\Delta_k}} \ge 0, \quad \sum_{k=1}^{K} tr(\Theta_{x_{\Delta_k}}) \le P \quad (3)$$

The covariance matrix $$\Theta_{x_{\Delta_k}}$$

corresponding to the data streams sent by the group k is defined by the pre-encoding block $V_k$ and the sending power values $\Sigma_k$, such that:

$$\Theta_{x_{\Delta_k}} = V_k \sum_k V_k.$$

Here below we recall the definition of the theoretical capacity per layer, also called a scalar capacity, or per antenna capacity, where the corrective term $\gamma$ is used to take account of the quality-of-service constraints:

$$C_{k,i} = \log_2\left(1 + \frac{\lambda_i(\sum_k)\lambda_i(B_k)}{\gamma}\right) \quad (4)$$

where:

$$B_k = H_{\Delta_k} \Theta_{z_k}^{-1} H_{\Delta_k} \quad (5)$$

$$\Theta_{z_k} = \sum_{j \ge k+1} H_{\Delta_j} \Theta_{x_{\Delta_j}} H_{\Delta_j} + I_{N_R}$$

with:
 † the conjugate transposed operator;
 $I_{N_R}$ the identity matrix sized $N_R$; and
 $H_{\Delta_k}$ representing a transmission sub-channel corresponding to the transmission channel between the antennas of the group k and the receiving antennas, such that $H = [H_{\Delta_1}, \ldots H_{\Delta_k}]$.

Here below, we present approximate solutions for optimizing the overall capacity of the transmission system. These solutions are sub-optimal but ensure low complexity as well as worthwhile performance characteristics.

It is thus assumed that the quantification error pertaining to the pre-encoding blocks is small enough and thus enables the description to be situated in the optimal context of one Waterfilling per group. In other words, it is assumed that the pre-encoding table or codebook comprises a sufficient number of pre-encoding blocks, or pre-encoding vectors used to build the pre-encoding blocks.

Furthermore, the sending is constrained to a successive interference cancellation receiver. The pre-encoding blocks therefore correspond to the basis of one Waterfilling operation for each stage of the vectorial SIC (or equivalently they are the eigen vectors of $B_k$ in the equation (5)).

The architecture of the optimal receiver is therefore reduced to a whitening filter followed by successive interference cancellations through the consideration of this optimal base.

Referring to the appendices A, B and C, a detailed description is given of the algorithms for determining sending parameters.

The proposed algorithms allow freedom in the scheduling of the different determining steps through iteration indices M and N, with M and N being two positive integers. They are omitted for greater clarity in the description of the steps here below. The number of iterations M and N is determined in order to obtain the convergence of the algorithm or again in order to limit computation complexity. For example, we have M=3 for the first algorithm (algorithm 1) and M=2, N=3 for the second algorithm (algorithm 2).

Thus, the computation of the required power value can be reduced to the following equation:

$$\lambda_i(\Sigma_k) = \frac{(2^{R_{k,i}} - 1)\gamma}{\lambda_i(B_k)} \quad (6)$$

As already indicated here above, the operation of quantification on the power value makes it necessary to round out the result to the higher integer value in order to be able to support the chosen MCS.

More specifically, appendix A illustrates the first algorithm (algorithm 1) for determining sending parameters in a single-user system (or point-to-point MIMO) implementing a groupwise power constraint.

The algorithm 1 thus proposes to integrate the power quantification and redistribution operations with each iteration k, where k∈{1,K}, i.e. for each group of antennas. This algorithm is therefore based on the iterative Waterfilling type of algorithm, used to optimize the pre-encoding blocks in sending mode with a separate power constraint for each group. It can also be noted that, relative to classic iterative Waterfilling type techniques, the proposed algorithm takes account of the discretization of the values (rates and/or power values) during the optimizing of the pre-encoding blocks and makes the assumption of a SIC receiver. Another difference lies in the fact that, in the single-user case, the power constraint to be complied with is a sum power constraint: the power budget of the group k+1 is therefore augmented by the remaining power of the group k.

The algorithm 1 first of all initiates the pre-encoding blocks at zero $$\{\Theta_{x_{\Delta_k}}\}_{k=1}^{K},$$

as well as the power budget allocated to each group $\{P_k\}_{k=1}^{K}$ complying with the constraint of the power budget $$\sum_{k=1}^{K} P_k = P.$$

For example, according to one particular variant, the power budget is distributed equitably between all the groups so as not to favor or disfavor one of the groups of antennas.

Appendix B illustrates a second algorithm (algorithm 2) to determine sending parameters in a single-user system implementing a sum power constraint.

Thus, the algorithm 2 takes account of a sum power constraint. The step 2 is therefore based on a sum-power iterative Waterfilling type algorithm.

Again, it can be noted that the proposed algorithm takes account of the discretization of the values (of rates and/or power) during the optimization of the pre-encoding blocks and assumes the presence of a SIC receiver.

Finally, appendix C illustrates a third algorithm (algorithm 3) to determine sending parameters in a single-user system in which the receiver has an MMSE-SIC type architecture (minimum mean square error-SIC architecture).

We consider a particular case of an embodiment of the invention according to which the quantification error on the pre-encoding block $V_k$ is non-negligible.

More specifically, if the metric between the pre-encoding blocks determined from the pre-encoding vectors coming from the codebook, associated with the receiver, and the pre-encoding blocks coming from the eigen vectors of $B_k$ is great, then the optimal receiver has a MMSE-SIC type architecture, assuming independent Gaussian inputs.

The equivalent channel $\tilde{H}$, taking account of the pre-encoding step is then defined by:

$$\tilde{H}=[H_{\Delta_1}\tilde{V}_1 \ldots H_{\Delta_K}\tilde{V}_K].$$

The expression of the theoretical capacity for each independent stream is expressed as follows:

$$C_i = \log_2\left(1 + \rho \tilde{h}_i^{\dagger}\left(I_{N_R} + \sum_{j \in S} P_j \tilde{h}_j \tilde{h}_i^{\dagger}\right)^{-1} \tilde{h}_i\right) \quad (12)$$

with: $\tilde{h}_i$ the $i^{th}$ column of the matrix of the equivalent channel $\tilde{H}$;

S the subset of sending antennas comprising antenna indices corresponding to the independent streams that remain to be decoded.

In this particular case, and as illustrated in the algorithm 3, it is necessary to take account of the processing of the interference during the optimizing of the sending parameters.

It can be noted that the algorithm 3 proposes an optimizing of the sending parameters in taking account of a power constraint per group of antennas. Again, the sending parameters can also be optimized in taking account of a sum-power constraint as proposed in the algorithm 2.

It can also be noted that these three algorithms implementing a technique of Waterfilling per group propose a redistribution of the power unused during the allocation of the rate values.

More specifically, taking account of the effect of the discretization on the multiple antenna systems implementing a Waterfilling type technique leads to reconsidering the manner of allocating the power. Thus, the power values are first of all fixed in a group through the classic Waterfilling algorithm. The covariance matrices are then generated with the eigen vectors of $B_k$. Once the rate values have been allocated, the power effectively necessary is recomputed. Then, the remaining power is used to increase, if possible, one or more discrete rate values. If there is any remaining unused power, even if it is insufficient to increase the sum-capacity, it is redistributed on the different antennas of the next group in order to reduce the bit error rate.

3. Description of a Particular Embodiment in a Multiple-User Context

The description shall henceforth be situated in a multiple-user context in which K users are present.

We consider an uplink configuration representing the uplink between the communications terminals (for example mobile terminals) and the base station. The term used in this MIMO channel configuration is that of "multiple-access channels" (MAC). The K users in this configuration therefore correspond to the different communications terminals and the receiver corresponds to the base station.

The algorithms 1 and 3 respectively presented in Appendices A and C can be used to determine the sending parameters in this context. In particular, it can be noted that, in the case of a MIMO MAC channel, it is necessary to restore the individual power constraints.

Consequently, the allocation of the residual power to increase the power budget of the next antenna group must be eliminated, and this corresponds to eliminating the step 6 of the algorithm 1 or of the algorithm 3.

Figure 4:
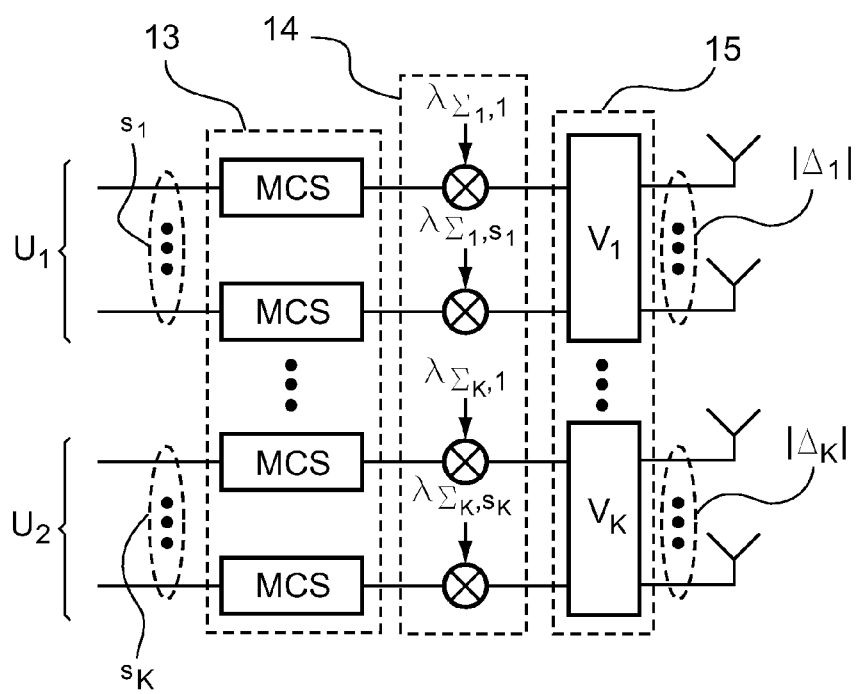
FIG. 4 proposes an example of a sending scheme in a multiple-user context.

FIG. 4 more specifically illustrates a sending scheme in the MIMO MAC multiple-user context implementing K users. In this embodiment, a group of antennas and hence a pre-encoding block is associated with each user $U_1, \ldots, U_K$. The same notations and references as those of FIG. 2 are used to designate the common elements.

Thus, in this embodiment, each user is deemed to experience a state of the channel denoted $H_{\Delta_1}, \ldots, H_{\Delta_K}$, where $H_{\Delta_i}$ represents the state of the transmission channel for the user i.

4. Structure of the Sending Device

Figure 5:
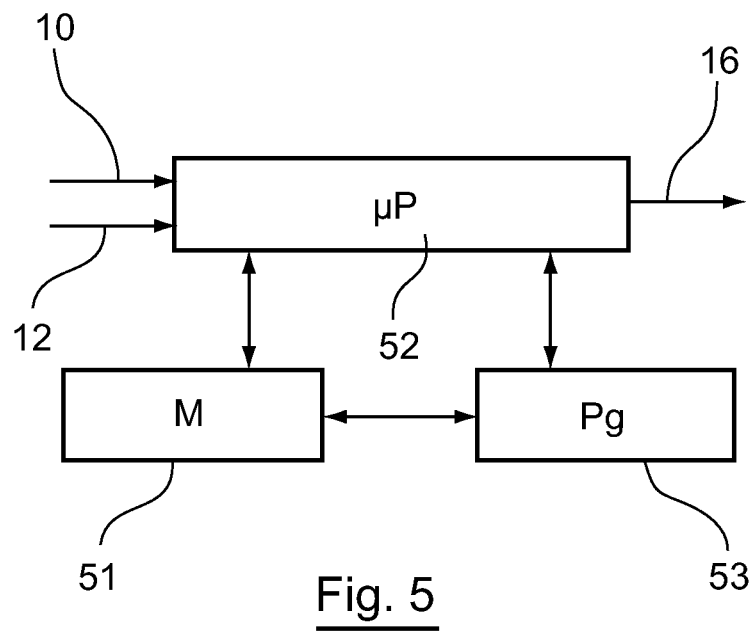
FIGS. 5 and 6 respectively present the simplified structure of a sender and a receiver according to a particular embodiment of the invention.
Figure 6:
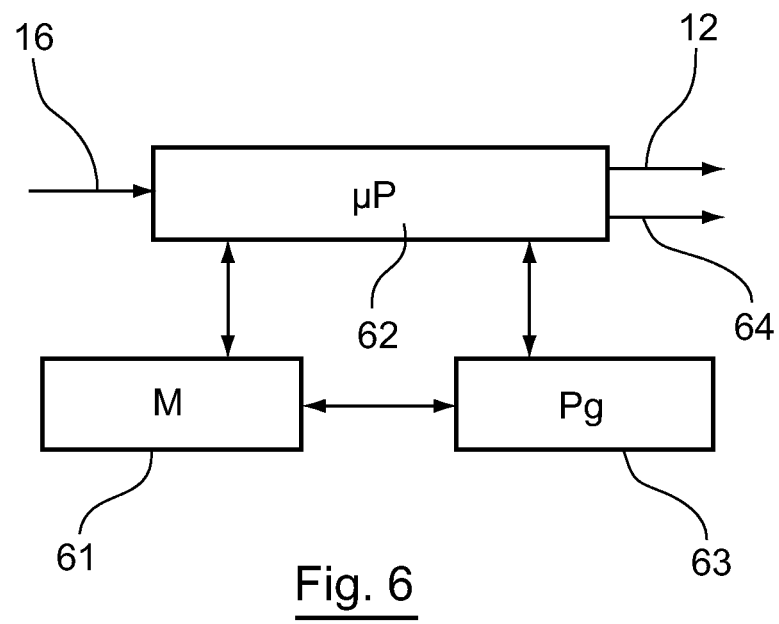

Finally, referring to FIGS. 5 and 6, we present the simplified structure of a sender and a receiver respectively implementing sending technique and a receiving technique according to the particular embodiment described here above. As illustrated in FIG. 5, a sender according to this particular embodiment comprises a memory 51 constituted by a buffer memory, a processing unit 52 equipped for example with a microprocessor μP and driven by the computer program 53 implementing the sending method according to an embodiment of the invention.

At initialization, the code instructions of the computer program 53 are loaded for example into a RAM and then executed by the processor of the processing unit 52. At input, the processing unit 52 receives a source data signal to be transmitted 10 as well as pieces of information coming from the receiver 12 (for instance the sending parameters or pieces of information used to determine these sending parameters, the distribution of the antennas or a piece of information representing the transmission channel, etc.)

The microprocessor of the processing unit 52 implements the steps of the sending method described here above according to the instructions of the computer program 53. To this end, the sender comprises, in addition to the buffer memory 51, means for distributing the sending antennas among several groups of antennas, means for assigning a rate value to each of the sending antennas, means for allocating a power value to each of the data streams, and means for the spatial pre-encoding of the signal.

These means are driven by the microprocessor of the processor unit 52.

The processing unit 52 therefore sends the receiver a pre-encoded signal 16, sent according to the sending parameters defined here above.

As illustrated in FIG. 6, a receiver according to the embodiment described, comprises a memory 61 constituted by a buffer memory, a processing unit 62 equipped for example with a microprocessor μP and driven by the computer program 63 implementing the receiving method according to an embodiment of the invention.

At initialization, the code instructions of the computer program 63 are loaded for example into a RAM and then executed by the processor of the processing unit 62. At input, the processing unit 62 receives a received signal corresponding to the sent signal 16.

The microprocessor of the processing unit 62 implements the steps of the receiving method described here above according to the instructions of the computer program 63. To this end, the receiver comprises, in addition to the buffer memory 61, means for obtaining at least one distribution of the sending antennas among several groups of antennas, means for determining a rate value to be assigned to each of the sending antennas, means for determining a power value to be allocated to each of the data streams, means for determining a blockwise diagonal pre-encoding matrix and means for transmitting the rate values, the power values and the pre-encoding matrix thus determined to the sender.

These means are driven by the microprocessor of the processor unit 62.

The processing unit 62 therefore delivers the decoded data signal or decoded data packets 64 as well as sending parameters to be transmitted to the sender in a feedback path 12.

In particular, such a receiver is a SIC type receiver.

5. Appendix A

---

Algorithm 1

Init  Initialize each covariance matrix at 0: $\{\Theta_{x_{\Delta_k}}\}_{k=1}^{K} = 0$ The power budget of each group is set at: $\{P_k\}_{k=1}^{K}$ for m = 1 to M do
| for k = 1 to K do
| | Step 1:  Generate composite channels (7)

$$G_{\Delta_k} = \left(\sum_{j=k}^{I} H_{\Delta_j} \Theta_{x_{\Delta_j}} H_{\Delta_j}^{\dagger} + I_{N_R}\right)^{-1/2} H_{\Delta_k}$$

| | Step 2:  Apply Waterfilling to $G_{\Delta_k}$ with the power $P_k$. We obtain $\Sigma_k$.
| | Step 3:  Generate the covariance matrix $\Theta_{x_{\Delta_k}}$
| |
| | from the orthonormal
| |     pre-encoded matrix $V_k$ which corresponds to the eigen vectors of $B_k$.
| | Step 4:  Allocate discrete scalar rate values:
| | for i = 1 to $s_k$ do
| | | With the $C_{k,i}$ values computed in the equation (4) select corresponding discrete
| | | rate value. cf equation (2). Compute minimum power needed to support the
| | | rate value chosen (for example equation (6)), quantify this value and update ($\Sigma_k$).
| | |
| | | so long as $\sum_{j=1}^{s_k} \lambda_j(\Sigma_k) > P_k$ do
| |
| | | | Select the directly lower discrete rate value.
| | | |_ Compute minimum power for this rate value, quantify and update $\lambda_i(\Sigma_k)$.
| | |_
| | Then, deduce from the residual power of the group k:

(8)

$$P_{res} = P_k - \sum_{i=1}^{s_k} \lambda_i(\Sigma_k)$$

| | Step 5: New selection of discrete scalar rate values:
| | Classify of the eigen values of $\Sigma_k$ in descending order by a permutation
| | σ.
| | for i = 1 to $s_k$ do
| | | With $\lambda_{\sigma(i)}(\Sigma_k) = \lambda_{\sigma(i)}(\Sigma_k) + P_{res}$, choice of discrete rate from
| | |     new $C_{k,i}$. Compute and quantify minimum power and update
| | |     $\lambda_{\sigma(i)}(\Sigma_k)$ and $P_{res}$.
| | |
| | | so long as $\sum_{j=1}^{s_k} \lambda_{\sigma(j)}(\Sigma_k) > P_k$ do

Algorithm 1 (continued)

```
|  |  |  |  Select directly lower discrete rate.
|  |  |  |__ Compute and quantify minimum power and update λ_σ(i)(Σ_k) and P_res.
|  |  |  Update the covariance matrix
|  |  Step 6: Allocate residual power P_res so as to increase the
|  |  power budget of the next group to be processed.
|  |                                                                               (9)
|  |
|  |     P_k = P_k − P_res
|  |    ⎧ P_{k+1} = P_{k+1} + P_res  if k < K
|  |    ⎨
|  |    ⎩ P_1 = P_1 + P_res  if not
|  |
|__|__
```

6. Appendix B

Algorithm 2

```
Init       Initialize each covariance matrix at 0:    {Θ_{x_{Δ_k}}}_{k=1}^K = 0

The power budget of each group is set at:   {P_k}_{k=1}^K for  m = 1 to M do
|  for     n = 1 to N do
|  |   Step 1:   Generate composite channels:
|  |                                                                               (10)
|  |
|  |          G_{Δ_k} = ( Σ_{j≠k} H_{Δ_j} Θ_{x_{Δ_j}} H_{Δ_j}^† + I_{N_R} )^{−1/2} H_{Δ_k}  ∀ k ∈ [1, K]
|  |
|  |   Step 2:   Apply Waterfilling to effective channels with the total power P,
|  |             i.e. apply Waterfilling to a diagonal block matrix formed by
|  |
|  |             G_{Δ_k}, ∀ k. We obtain { Σ_k }_{k=1}^K.
|  |   Step 3:   Generate covariance matrices {Θ_{x_{Δ_k}}}_{k=1}^K from the orthonormal
|  |__           pre-encoded matrix V_k which corresponds to the eigen vectors of B_k.
|  Step 4:      Allocate discrete scalar rate values:
|  for    k = 1 to K do
|  |  for    i = 1 to s_k do
|  |  |        With the C_{k,i} values computed in the equation (4) select corresponding discrete
|  |  |        rate value. cf equation (2). Compute minimum power needed to support
|  |  |        (for example equation (6)), quantify and update λ_i(Σ_k).
|  |  |
|  |  |      so long as Σ_{j=1}^{s_k} λ_j(Σ_k) > P_k  do
|  |  |
|  |  |        Select the directly lower discrete rate value. Compute
|__|__|__     minimum power for this rate value, quantify and update λ_i(Σ_k).

Then, deduce from the total power really consumed:
|                                                                                   (11)
|
|                  P_used = Σ_{k=1}^K Σ_{i=1}^{s_k} λ_i(Σ_k)
|
|  Step 5:  New selection of discrete scalar rate values with the residual
|  power    P_res = P − P_used:
|  Classify the eigen values of Σ_k   in descending order by a permutation σ.
|  for    k = 1 to K do
|  |  for    i = 1 to s_k do
|  |  |        With λ_σ(i)(Σ_k) = λ_σ(i)(Σ_k) + P_res, choice of discrete rate
|  |  |        from new C_{k,i}. Compute and quantify minimum power for
|  |  |        this rate value and update λ_σ(i)(Σ_k) and P_res.
|  |  |
|  |  |      so long as Σ_{j=1}^{s_k} λ_σ(j)(Σ_k) > P_k  do
|  |  |
|  |  |        Select directly lower discrete rate.
|  |  |__    Compute and quantify minimum power, and update λ_σ(i)(Σ_k) and P_res.
|__|__      Update the covariance matrix
```

7. Appendix C

---
Algorithm 3
---

Init Initialize each covariance matrix at 0: $\{\Theta_{x_{\Delta_k}}\}_{k=1}^{K} = 0$ The power budget of each group is set at: $\{P_k\}_{k=1}^{K}$ for m = 1 to M do
  for k = 1 to K do
    Step 1:   Generate composite channels $$G_{\Delta_k} = \left(\sum_{j \neq k} H_{\Delta_j} \Theta_{x_{\Delta_j}} H_{\Delta_j}^{\dagger} + I_{N_R}\right)^{-1/2} H_{\Delta_k} \quad (13)$$

Step 2:   Apply Waterfilling to $G_{\Delta_k}$ with the power $P_k$. We obtain $\Sigma_k$.
    Step 3:   Compute the pre-encoding matrix $V_k$ corresponding to the eigen vectors of $B_k$. Quantify $V_k$ i.e. choose the most proximate matrix in the available codebook denoted as $\tilde{V}_k$. Generate covariance matrix.

$$\Theta_{x_{\Delta_k}} = E\{\tilde{V}_k \Sigma_k \tilde{V}_k^{\dagger}\}$$

Step 4:   Allocate discrete scalar rate values:
    for $i \in \Delta_k$ do
      With the $C_i$ values computed in the equation (12) select the corresponding discrete rate value (similarly to equation (2). Compute minimum power needed for this rate value, quantify and update $\lambda_i(\Sigma_k)$.
      so long as $\sum_{j \in \Delta_k} \lambda_j(\Sigma_k) > P_k$ do
        Select the directly lower discrete rate value for $C_i$.
        Compute and quantify minimum power, and update $\lambda_i(\Sigma_k)$.
    Then, deduce from the residual power of the group k:

$$P_{res} = P_k - \sum_{i \in \Delta_k} \lambda_i(\Sigma_k) \quad (14)$$

Step 5:   New selection of discrete scalar rate values: Classify the eigen values of $\Sigma_k$ in descending order by a permutation $\sigma$.
    for $i \in \Delta_k$ do
      With $\lambda_{\sigma(i)}(\Sigma_k) = \lambda_{\sigma(i)}(\Sigma_k) + P_{res}$, choice of discrete rate from new $C_i$. Compute and quantify the minimum power and update $\lambda_{\sigma(i)}(\Sigma_k)$ and $P_{res}$.
      so long as $\sum_{j \in \Delta_k} \lambda_{\sigma(j)}(\Sigma_k) > P_k$ do
        Select directly lower discrete rate $C_i$.
        Compute and quantify minimum power, and update $\lambda_{\sigma(i)}(\Sigma_k)$ and $P_{res}$.
    Update the covariance matrix.
    Step 6:   Allocate residual power $P_{res}$ so as to increase the power budget of the next group to be processed. (15)

$$P_k = P_k - P_{res}$$
$$\begin{cases} P_{k+1} = P_{k+1} + P_{res} & \text{if } k < K \\ P_1 = P_1 + P_{res} & \text{if not} \end{cases}$$

---

Although the present disclosure has been described with reference to one or more examples, workers skilled in the art will recognize that changes may be made in form and detail without departing from the scope of the disclosure and/or the appended claims.

The invention claimed is:

1. A method for sending a signal from a sender to a receiver through a transmission channel, in the form of a set of data streams between $N_T$ sending antennas and $N_R$ receiving antennas, with $N_T$ and $N_R$ being greater than or equal to 2, said method comprising:
 distributing the sending antennas among several groups of at least one antenna, at least one group comprising two antennas, as a function of at least one piece of information representing said transmission channel;
 assigning a rate value to each of said sending antennas;
 allocating a sending power value to each of said data streams; and
 spatially pre-encoding said signal, implementing a block diagonal pre-encoding matrix comprising at least two blocks, each block being associated with one of said groups of antennas.

2. The method for sending according to claim 1, wherein said rate values are chosen, as a function of at least one constraint dictated by said receiver, from a predetermined set of discrete rate values.

3. The method for sending according to claim 1, wherein said pre-encoding step comprises obtaining eigen vectors associated with each of said blocks so as to transmit said signal on the non-zero eigen values of each of the sub-channels,
 a sub-channel corresponding to the transmission channel between the sending antennas of one of said groups, associated with one of said blocks of the pre-encoding matrix, and said receiving antennas.

4. The method for sending according to claim 1, wherein the method comprises updating at least one element belonging to the group comprising:

at least one of said blocks;
at least one of said rate values;
at least one of said sending power values;
at least one pre-encoding vector, each block of the pre-encoding matrix comprising at least one pre-encoding vector;
as a function of a piece of feedback information from said receiver.

5. The method for sending according to claim 1, wherein the method comprises receiving at least one element belonging to the group comprising:
a piece of information on the distributing into groups of said sending antennas;
said information representing said transmission channel;
said rate values assigned to each of said sending antennas;
said pre-encoding matrix;
said blocks forming said pre-encoding matrix;
pre-encoding vectors to build said pre-encoding matrix;
sending power values required for each of said data streams, for each group of sending antennas or for all the sending antennas.

6. The method for sending according to claim 1, wherein the step of distributing is implemented periodically and/or as a function of a variation of said transmission channel.

7. A computer program product recorded on a non-transitory computer readable carrier comprising program code instructions for implementing, a method for sending a signal from a sender to a receiver through a transmission channel, in the form of a set of data streams between $N_T$ sending antennas and $N_R$ receiving antennas, with $N_T$ and $N_R$ being greater than or equal to 2, when the instructions are executed by a computer, said method comprising:
distributing the sending antennas among several groups of at least one antenna, at least one group comprising two antennas, as a function of at least one piece of information representing said transmission channel;
assigning a rate value to each of said sending antennas;
allocating a sending power value to each of said data streams; and
spatially pre-encoding said signal, implementing a block diagonal pre-encoding matrix comprising at least two blocks, each block being associated with one of said groups of antennas.

8. A sender for sending a signal to a receiver through a transmission channel, in the form of a set of data streams between $N_T$ sending antennas and $N_R$ receiving antennas, with $N_T$ and $N_R$ being greater than or equal to 2, said sender comprising:
means for distributing the sending antennas among several groups of at least one antenna, at least one group comprising two antennas, as a function of at least one piece of information representing said transmission channel;
means for assigning a rate value to each of said sending antennas;
means for allocating a sending power value to each of said data streams; and
means for spatially pre-encoding of said signal, implementing a block diagonal pre-encoding matrix comprising at least two blocks, each block being associated with one of said groups of antennas.

9. A method for receiving a received signal, corresponding to a signal sent by a sender to a receiver through a transmission channel, in the form of a set of data streams between $N_T$ sending antennas and $N_R$ receiving antennas, with $N_T$ and $N_R$ being greater than or equal to 2, said method comprising:
obtaining, as a function of a piece of information representing the transmission channel, at least one distribution of said sending antennas in several groups of at least one antenna, at least one group comprising two antennas;
determining a rate value to be assigned to each of said sending antennas;
determining a sending power value to be allotted to each data stream;
determining a block diagonal pre-encoding matrix comprising at least two blocks, each block being associated with one of said groups of antennas; and
transmitting said rate values, said sending power values, and said pre-encoding matrix to the sender.

10. The method for receiving according to claim 9, wherein said rate values are chosen from a predetermined set of discrete rate values.

11. The method for receiving according to claim 9, wherein said receiver is a successive interference cancellation type of receiver.

12. A computer program product comprising program code instructions for implementing a method for receiving a received signal, corresponding to a signal sent by a sender to a receiver through a transmission channel, in the form of a set of data streams between $N_T$ sending antennas and $N_R$ receiving antennas, with $N_T$ and $N_R$ being greater than or equal to 2, when the instructions are executed by a computer, said method comprising:
obtaining, as a function of a piece of information representing the transmission channel, at least one distribution of said sending antennas in several groups of at least one antenna, at least one group comprising two antennas;
determining a rate value to be assigned to each of said sending antennas;
determining a sending power value to be allotted to each data stream;
determining a block diagonal pre-encoding matrix comprising at least two blocks, each block being associated with one of said groups of antennas; and
transmitting said rate values, said sending power values, and said pre-encoding matrix to the sender.

13. A receiver capable of receiving a received signal, corresponding to a signal sent by a sender through a transmission channel, in the form of a set of data streams between $N_T$ sending antennas and $N_R$ receiving antennas, with $N_T$ and $N_R$ being greater than or equal to 2, said receiver comprising:
means for obtaining, as a function of a piece of information representing the transmission channel, at least one distribution of sending antennas in several groups of at least one antenna, at least one group comprising two antennas;
means for determining a rate value to be assigned to each of said sending antennas;
means for determining a sending power value to be allocated to each of said data streams;
means for determining a block diagonal pre-encoding matrix comprising at least two blocks, each block being associated with one of said groups of antennas; and
means for transmitting said rate values, said sending power values, and said pre-encoding matrix to said sender.

14. A system for transmitting comprising:
a sender comprising $N_T$ sending antennas; and
a receiver comprising $N_R$ receiving antennas with $N_T$ and $N_R$ being greater than or equal to 2, said system being capable of sending a signal to said receiver through a transmission channel, in the form of a set of data streams between the $N_T$ sending antennas and the $N_R$ receiving antennas, wherein:

said receiver comprises:
  means for obtaining, as a function of a piece of information representing said transmission channel, at least one distribution of said sending antennas in several groups of at least one antenna, at least one group comprising two antennas,
said sender comprises means for distributing sending antennas according to said distribution;
said receiver also comprises:
  means for determining a rate value to be assigned to each of said sending antennas;
  means for determining a sending power value to be allocated to each of said data streams;
  means for determining a block diagonal pre-encoding matrix comprising at least two blocks, each block being associated with one of said groups of antennas; and
  means for transmitting, to said sender, said rate values, said sending power values and said pre-encoding matrix, and
said sender also comprises:
  means for assigning said rate values to said sending antennas;
  means for allocating said sending power values to said data streams;
  means for spatially pre-encoding of said signal to be sent, implementing said pre-encoding matrix.

* * * * *

UNITED STATES PATENT AND TRADEMARK OFFICE
CERTIFICATE OF CORRECTION

PATENT NO.         : 8,422,582 B2                                                Page 1 of 1
APPLICATION NO.    : 12/679218
DATED              : April 16, 2013
INVENTOR(S)        : Layec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 470 days.

Signed and Sealed this

Eighth Day of September, 2015

Michelle K. Lee
*Director of the United States Patent and Trademark Office*